United States Patent
Fairweather et al.

(10) Patent No.: US 10,869,480 B2
(45) Date of Patent: Dec. 22, 2020

(54) METHODS OF TREATING CITRUS GREENING DISEASE

(71) Applicant: Tessenderlo Kerley, Inc., Phoenix, AZ (US)

(72) Inventors: Thomas David Fairweather, Dundee, OR (US); Bert Richard Bock, Florence, AL (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 0 days.

(21) Appl. No.: 15/676,798

(22) Filed: Aug. 14, 2017

(65) Prior Publication Data

US 2018/0042238 A1  Feb. 15, 2018

Related U.S. Application Data

(60) Provisional application No. 62/375,429, filed on Aug. 15, 2016.

(51) Int. Cl.
   *A01N 59/02*  (2006.01)

(52) U.S. Cl.
   CPC .................................. *A01N 59/02* (2013.01)

(58) Field of Classification Search
   CPC ...................................................... A01N 59/02
   See application file for complete search history.

(56) References Cited

U.S. PATENT DOCUMENTS

| | | | | |
|---|---|---|---|---|
| 4,300,941 | A  * | 11/1981 | Nakama | 71/65 |
| 8,568,506 | B1 * | 10/2013 | Miller | C05B 7/00 |
| | | | | 239/727 |
| 2010/0074972 | A1 * | 3/2010 | Rouseff | A01N 27/00 |
| | | | | 424/712 |

* cited by examiner

*Primary Examiner* — Johann R Richter
*Assistant Examiner* — Danielle Sullivan
(74) *Attorney, Agent, or Firm* — Fennemore, P.C.

(57) ABSTRACT

Described herein is a method for slowing the progression of citrus greening disease. The method may substantially stop the progression of citrus greening disease, preventing the loss of all or part of a citrus harvest. The method comprises the application of one or more thiosulfates in irrigation water to the root zone of a citrus tree.

22 Claims, 1 Drawing Sheet

Note: Differences between treatments at a given depth-sampling time that have different letters next to the numbers are statistically significant at the 5% (five percent) level

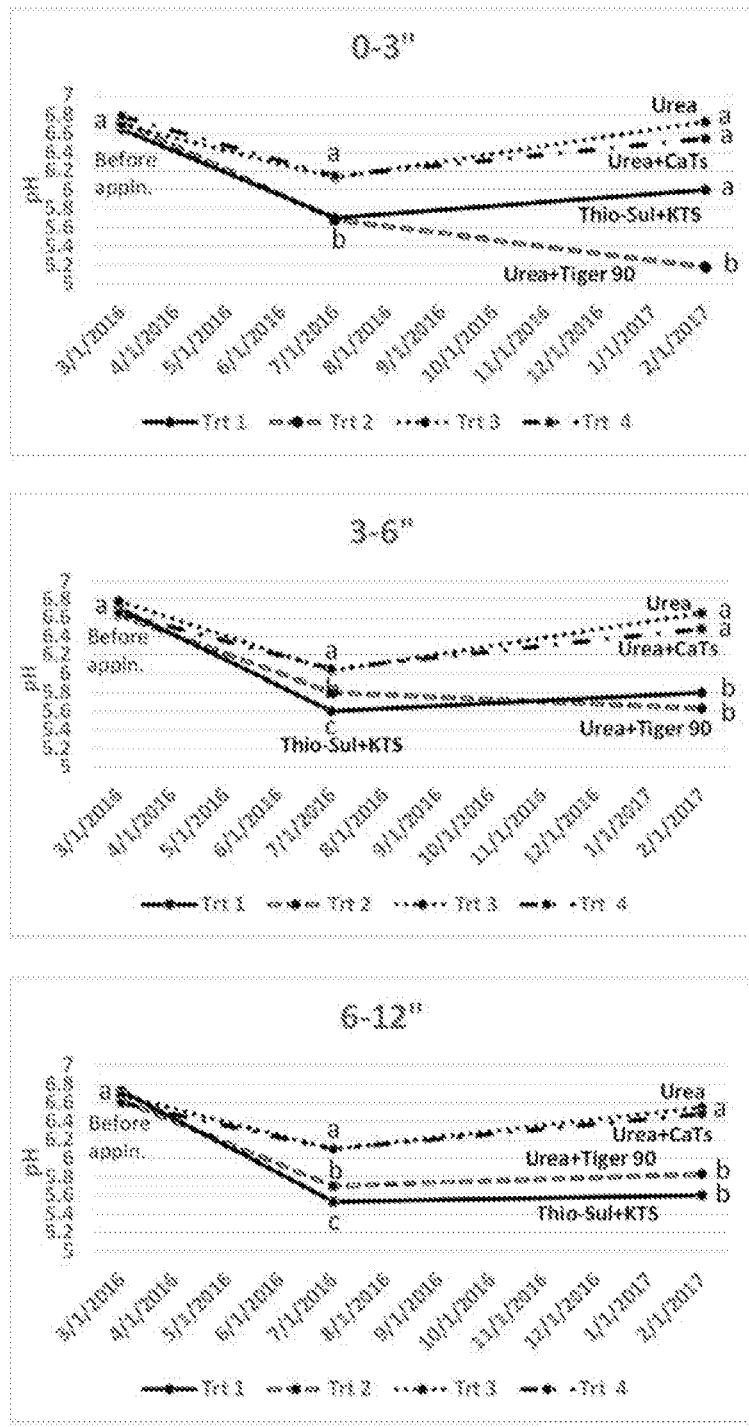
Note: Differences between treatments at a given depth-sampling time that have different letters next to the numbers are statistically significant at the 5% (five percent) level

METHODS OF TREATING CITRUS GREENING DISEASE

CROSS-REFERENCE TO RELATED APPLICATIONS

This application claims priority to U.S. provisional application No. 62/375,429 filed on Aug. 15, 2016, which is hereby incorporated herein by reference for all that it discloses.

FIELD OF THE INVENTION

The invention relates to the treatment of agricultural disease.

BRIEF SUMMARY OF THE INVENTION

Disclosed herein are methods for treating and/or preventing citrus greening disease. The method may slow or even substantially stop the progression of citrus greening disease, preventing the loss of all or part of a citrus harvest. The methods comprise the application of a solution of one or more thiosulfates to the root zone of a citrus tree, so that substantially all of the soil in substantially the entire root zone has a pH in the range of about 4.5 to about 7.5, or more preferably a narrower pH range of about 5.5 to about 6.5. Via the methods of the invention described herein, the pH of the root zone soil may be maintained within these ranges for an extended period of time. The methods described herein result in an unexpectedly faster acidification of the soil in the tree's root zone, to a greater depth and without over acidifying near the soil surface, as compared to previously known methods and products currently used to acidify the soil. The use of thiosulfates according to the invention unexpectedly improves the ability of the tree roots to be healthy, and avoid or recover from the effects of HLB, because thiosulfates affect more of the tree's root zone, and represents a significant improvement over attempts in the prior art to treat citrus greening disease.

BRIEF DESCRIPTION OF THE DRAWINGS

FIG. 1 comprises three graphs illustrating the results of experiments demonstrating that the methods according to the invention resulted in a significantly greater decrease in pH at lower depths in the soil, as compared with other treatments.

DETAILED DESCRIPTION OF THE INVENTION

The invention relates to methods for the treatment of citrus greening. Citrus greening is also known as Huanglongbing or HLB, and is a disease wherein citrus trees are unable to transport carbohydrates or carbon, oftentimes ultimately resulting in fruit drop. In a healthy citrus tree under normal conditions, the fruit will remain on the tree for quite some time after the fruit ripens. Therefore, the fruit normally remains on the tree until it is harvested. However, citrus trees effected by citrus greening disease produce fruit that does not properly mature and ripen, is smaller than normal and often the fruit falls off the tree. Generally speaking, citrus greening results in significant loss of citrus production, particularly the production of oranges. Other types of citrus may also be adversely affected by citrus greening.

Citrus greening disease is vectored by an insect, the Asian citrus psyllid. The insect transmits to the tree a bacterium, the *Candidatus Liberibacter asiaticus*. Citrus greening disease has had, and is anticipated to have, a significantly negative impact on citrus production in geographic areas throughout the world, such as in Argentina, Brazil, Mexico and the United States.

For example, the occurrence of HLB in the state of Florida has increased each year since it was first confirmed in 2005. HLB has profound effects on the citrus market, which in turn has profound effects on the Florida economy, as citrus is currently the largest commodity produced in Florida. Citrus production has declined in Florida, and is expected to continue to decline, with HLB considered to be a primary cause.

HLB effects citrus crops in the following manner. In an orange tree, about two months before harvest, sugars move from the leaves into the fruit, resulting in increases in Brix and in the sugar to acid ratio. In a tree infected with HLB, starch accumulates in the leaf cells and disrupts the chloroplasts, resulting in mottling of the leaves. In addition, in a tree infected with HLB, movement of sucrose from the leaves to the fruit through the phloem is reduced. This lack of carbohydrate supply to the fruit causes the fruit to starve and prematurely drop from the tree.

In addition, as a result of infection with HLB, the roots of a citrus tree decline, which means that the tree's root density decreases, thereby reducing the tree's ability to take up nutrients. A citrus tree takes in nutrients via its feeder roots, which are relatively small in diameter as compared with the tree's tap root. The majority of the feeder roots are within an area referred to as the "root zone" of the tree, which extends from the soil surface to about twelve (12) inches below the soil surface, and radially outward from the trunk to a few inches beyond the outer leaves of the tree's canopy. The term "root density" refers to the quantity of feeder roots in the soil, and may be measured and quantitatively expressed as the total length of the feeder roots in a certain volume of soil. In fact, citrus greening disease in the early stages has a more significant negative impact on roots than on the tops of trees (i.e., leaves, branches, other portions of the tree above ground). Adequate root density is essential for maintaining tree health and productivity.

It has been found prior to the invention described herein that in trees afflicted with citrus greening disease, root density is related to soil pH. More specifically, with greening, decreased root density has been found to be correlated with (and likely caused by) increasing soil pH. High soil pH is common in Florida citrus soils because of bicarbonates in irrigation water, application of lime to prevent copper toxicity, and/or naturally occurring calcium carbonate in the soil. As used herein, the term "high soil pH" means higher than 5.5 pH.

In at least one embodiment of the invention, the methods involve treating the soil to cause a decrease in the pH of the soil at lower depths of soil containing the fine roots, i.e., in the lower depths of the root zone, without causing an undesirably excessive decrease in the pH of the soil at upper depths. According to the invention, thiosulfate(s) is(are) applied to the soil as described herein to achieve a root zone pH in the range of about 4.5 to about 7.5. ("Root zone pH" as used herein means the pH of the soil throughout substantially the entire root zone.) Preferably, the thiosulfate(s) is(are) applied to the soil to result in a root zone pH in the range of about 5.0 to about 7.0, and more preferably in the range of about 5.5 to about 6.5, and still more preferably, in the range of about 5.5 to 6.0.

Without intending to be bound by this theory, it is believed by the inventors that compared with conventional methods to decrease soil pH, the methods described herein result in significantly improved root density due to unexpectedly decreasing the pH of the soil in the tree's root zone to a greater depth, without decreasing the pH near the soil surface to a degree that would be detrimental to tree growth and production. A greater root density then enhances the ability of the tree to absorb nutrients (including but not limited to the nutrients from the thiosulfate itself), thereby unexpectedly enhancing the tree's ability to overcome the effects of citrus greening disease. In contrast, prior art methods for acidifying the soil use acidifiers such as elemental sulfur or sulfuric acid, that acidify the soil to a greater extent near the soil surface than at lower depths.

High soil pH is especially problematic for greening-affected citrus. To combat this, acidification of the soil and irrigation water is used in the prior art, in order to reduce root zone pH and promote the release of nutrients such as calcium, magnesium and potassium from the soil, so that the nutrients can be taken up by the tree's roots. For example, to lower the pH of the soil, the prior art methods condition the soil by adding such things as sulfuric acid or elemental sulfur fertilizers (for example, Tiger 90®, which is elemental sulfur bound together with a clay binder). In addition, in the prior art, conditioning of the irrigation water to reduce its pH is frequently accomplished by adding or injecting into the irrigation water acids such as phosphoric acid, sulfuric acid or urea-sulfuric acid fertilizer. However, the prior art methods have failed to successfully combat citrus greening, because they fail to effectively treat the entire root zone.

In contrast, the new methods described herein combat HLB, by treating the roots and/or soil next to the roots with thiosulfate or thiosulfates applied incrementally in irrigation water as dual nutrient source-acidifiers. The term "applied incrementally" as used herein denotes that the thiosulfate(s) is(are) applied more frequently than the prior art's typical fertilization of citrus using dry, non-thiosulfate fertilizers applied three (3) times during the growing season, which is less effective in combatting HLB and citrus greening disease. Preferably, the methods of the invention comprise incremental application of the thiosulfate(s) on a monthly basis. Even more preferably, the thiosulfate(s) is(are) applied on a weekly basis, although application on a weekly basis is often not practical. The method results in acidification of the soil in and around substantially the entire root zone. Acidification of the soil in substantially the entire root zone promotes the release from the soil, and uptake by the tree, of nutrients such as calcium, magnesium and potassium.

The methods described herein result in an unexpectedly faster acidification of the soil to a greater depth without over acidifying near the soil surface as compared to other methods and products that have been and are currently used to acidify the soil. Unlike the prior art, the methods described herein lower the pH in substantially the tree's entire root zone. The use of thiosulfates according to the invention unexpectedly improves the ability of the tree roots to be healthy, and avoid or recover from the effects of HLB, because thiosulfates affect more of the tree's root zone.

The methods described herein increase the availability to the tree of nutrients in the soil such as iron and manganese, due to thiosulfates being good reducing agents. This is particularly beneficial in high pH soils such as those found in many citrus growing areas.

Accordingly, described herein are methods for stopping or slowing progression of citrus greening disease, comprising applying one or more thiosulfates to or near the roots of a citrus tree. Generally speaking, the thiosulfates are preferably applied incrementally from bloom until harvest of fruit from the citrus tree.

More specifically, the method involves applying the thiosulfate in irrigation water, i.e., via fertigation. The fertigation method may utilize microsprinklers, which are also known as microjets, or other types of fertigation. Non-fertigation methods may be used to apply the thiosulfate, but fertigation is preferred.

The preferred thiosulfates used in the method are one or more selected from the group consisting of ammonium thiosulfate, calcium thiosulfate, magnesium thiosulfate and potassium thiosulfate. Combinations of the aforementioned thiosulfates may be used in the methods described herein.

According to the invention, the thiosulfate(s) may be applied at rates up to those required to satisfy the tree's requirements for nutrients associated with the thiosulfate ion other than sulfur (i.e., nitrogen, potassium, calcium, and/or magnesium). The acidification due to the thiosulfate ion and the ammonium ion in ammonium thiosulfate results in thiosulfates serving as dual nutrient source-acidifiers. More particularly, the thiosulfates are preferably applied incrementally in irrigation water to match the timing of the tree's requirements for nutrients.

Even more preferably, the thiosulfate(s) is(are) applied incrementally from approximately February through November in the northern hemisphere.

In optional embodiments, one or more agriculturally beneficial substances are applied prior to, substantially simultaneously with, or after application of the thiosulfate(s). Agriculturally beneficial substances may be fertilizers, soil conditioners, growth agents, etc.

Experiments were conducted demonstrating the methods of the present invention using thiosulfates. The treatments compared the effects of the concurrent use of two thiosulfates, ammonium thiosulfate and potassium thiosulfate (Treatment 1) according to one embodiment of the invention, to the use of conventional fertilizer-acidifier combinations. Treatments compared are described in Table 1.

TABLE 1

TREATMENTS

| Treatment | 200 lb N/Ac 220 lb K$_2$O/Ac | | | lb S/Ac | Calc. lb CaCO$_3$ eq. Neutralized/Ac |
|---|---|---|---|---|---|
| 1 | Ammonium thiosulfate (Thio-Sul ®) | Potassium thiosulfate (KTS ®) | | 613 | 2384 |
| 2 | Urea | Potassium nitrate KNO$_3$ | Tiger 90 ® | 622 | 2384 |
| 3 | Urea | Potassium sulfate K$_2$SO$_4$ | | 122 | 767 |
| 4 | Urea | Potassium sulfate K$_2$SO$_4$ | Calcium thiosulfate (CaTs ®), 50 lb Ca/Ac | 205 | 897 |

Treatments 1 and 4 applied in irrigation water, 8 monthly increments
Treatments 2 and 3 ground-applied in 3 applications Each treatment began in March 2016. Each treatment provided a typical amount of nitrogen (200 lb N per acre) and potassium (220 lb K$_2$O per acre) for citrus. Treatment 3 is a common low acidifying treatment that also provides nitrogen and potassium (the small amount of acidification is from the urea; ammonium nitrate and urea-ammonium nitrate solution provide the same amount of acidity for given amount of nitrogen applied, but more acidity generally is required to combat greening). Treatment 4 is the same as Treatment 3 except for inclusion of supplemental calcium from calcium thiosulfate and the associated acidity. Treatments 1 and 2 are highly acidifying treatments projected to lower soil pH to a more optimal level for preventing or treating greening. Treatment 2 is currently a common practice for greening-affected citrus in Florida and Treatment 1 (according to an embodiment of the invention) is being evaluated as an alternative.

The results of the experiments are set forth in Tables 2, 3 and 4, and are also illustrated graphically in FIG. 1, and reflect that treatments according to the invention resulted in a significantly greater decrease in pH at lower depths in the soil, as compared with other fertilizers. Note: Differences between treatments at a given depth-sampling time that have different letters next to the numbers in the Tables and FIG. 1 are statistically significant at the 5% (five percent) level.

TABLE 2

Soil pH, Depth of Soil 0-3 inches

| Treatment | | | | Mar. 18, 2016 pH (before treatment) | Jul. 29, 2016 pH (after treatment) | Feb. 24, 2017 pH (after treatment |
|---|---|---|---|---|---|---|
| 1 | Ammonium thiosulfate (Thio-Sul ®) | Potassium thiosulfate (KTS ®) | | 6.65 a | 5.70 b | 6.00 a |
| 2 | Urea | Potassium nitrate | Tiger 90 ® | 6.73 a | 5.68 b | 5.18 b |
| 3 | Urea | Potassium sulfate | | 6.70 a | 6.13 a | 6.73 a |
| 4 | Urea | Potassium sulfate | Calcium thiosulfate (CaTs ®) | 6.70 a | 6.15 b | 6.55 a |
| $LSD_{0.05}$ | | | | 0.27 | 0.34 | 0.74 |

Note: the differences between treatments at a given sampling time that have different letters next to the numbers are statistically significant at the 5% (five percent) level.

TABLE 3

Soil pH, Depth of Soil 3-6 inches

| Treatment | | | | Mar. 18, 2016 pH (before treatment) | Jul. 29, 2016 pH (after treatment) | Feb. 24, 2017 pH (after treatment |
|---|---|---|---|---|---|---|
| 1 | Ammonium thiosulfate (Thio-Sul ®) | Potassium thiosulfate (KTS ®) | | 6.70 a | 5.60 c | 5.85 b |
| 2 | Urea | Potassium nitrate | Tiger 90 ® | 6.63 a | 5.80 b | 5.63 b |
| 3 | Urea | Potassium sulfate | | 6.78 a | 6.03 a | 6.65 a |
| 4 | Urea | Potassium sulfate | Calcium thiosulfate (CaTs ®) | 6.65 a | 6.05 b | 6.48 a |
| $LSD_{0.05}$ | | | | 0.37 | 0.15 | 0.43 |

Note: the differences between treatments at a given sampling time that have different letters next to the numbers are statistically significant at the 5% (five percent) level.

TABLE 4

Soil pH, Depth of Soil 6-12 inches

| Treatment | | | | Mar. 18, 2016 pH (before treatment) | Jul. 29, 2016 pH (after treatment) | Feb. 24, 2017 pH (after treatment |
|---|---|---|---|---|---|---|
| 1 | Ammonium thiosulfate (Thio-Sul ®) | Potassium thiosulfate (KTS ®) | | 6.73 a | 5.53 c | 5.60 b |
| 2 | Urea | Potassium nitrate | Tiger 90 ® | 6.63 a | 5.70 bc | 5.83 b |

TABLE 4-continued

Soil pH, Depth of Soil 6-12 inches

| Treatment | | | | Mar. 18, 2016 pH (before treatment) | Jul. 29, 2016 pH (after treatment) | Feb. 24, 2017 pH (after treatment) |
|---|---|---|---|---|---|---|
| 3 | Urea | Potassium sulfate | | 6.68 a | 6.10 a | 6.55 a |
| 4 | Urea | Potassium sulfate | Calcium thiosulfate (CaTs ®) | 6.60 a | 6.10 a | 6.48 a |
| LSD$_{0.05}$ | | | | 0.29 | 0.29 | 0.50 |

Note:
the differences between treatments at a given sampling time that have different letters next to the numbers are statistically significant at the 5% (five percent) level.

By the end of July 2016, the low acidifying Treatments 3 and 4 lowered soil pH to a moderate extent at all three depths; however, by late February of the following year enough bicarbonate had been applied in irrigation water to bring soil pH back up to near the starting point the previous March (FIG. 1). Compared with Treatment 2 (urea-Tiger 90®), the thiosulfate fertilizers in Treatment 1 gave a greater reduction in soil pH at lower depths without over-acidifying near the soil surface. Furthermore, Treatment 2 with urea and Tiger 90® (elemental sulfur bound together in granular form with clay) did not acidify the soil as quickly as the thiosulfates in Treatment 1. These results demonstrate that the use of thiosulfate has an unexpectedly greater effect at decreasing pH deeper in the soil than other acidifying agents and fertilizer compositions without over acidifying near the soil surface.

Accordingly, the present invention relates to methods for treating citrus greening disease, meaning for preventing, stopping and/or slowing the progression of citrus greening disease, comprising applying thiosulfate to or near the roots of a citrus tree. The thiosulfate is one or more selected from the group consisting of ammonium thiosulfate, calcium thiosulfate, magnesium thiosulfate and potassium thiosulfate. A preferred method applies the thiosulfate in irrigation water (i.e., fertigation). The fertigation may utilize microsprinklers. In one embodiment the thiosulfate is applied at rates at or below rates required to satisfy the tree's requirement for thiosulfate-associated nutrients other than sulfur. Preferably, the thiosulfate is applied at rates at or below rates required to satisfy the tree's requirement for one or more thiosulfate-associated nutrients selected from the group consisting of nitrogen, potassium, calcium, and magnesium. Preferably, the thiosulfate is applied incrementally in irrigation water.

In a preferred embodiment, the thiosulfate is applied from bloom until harvest of fruit from the citrus tree.

Optionally, the method may further comprise applying an agriculturally beneficial substance prior to, substantially simultaneously with, or after application of the thiosulfate.

The methods according to the invention preferably comprise applying thiosulfate to achieve a root zone soil pH in the range of about 4.5 to about 7.5. More preferably, the thiosulfate(s) is(are) applied to the soil in such a manner as to result in a root zone pH in the range of about 5.0 to about 7.0, and even more preferably in the range of about 5.5 to about 6.5, and still more preferably, in the range of about 5.5 to 6.0.

What is claimed:

1. A method for increasing yield of fruit of a citrus tree by improving the tree's ability to withstand effects of Citrus Greening Disease, wherein said method comprises causing the tree's substantially entire root zone to achieve a root zone pH in the range of about 4.5 to about 7.5, without over acidifying the soil's surface, by incrementally applying thiosulfate to or near the tree's roots.

2. The method of claim 1, wherein the thiosulfate is applied via fertigation.

3. The method of claim 2, wherein the fertigation utilizes microsprinklers.

4. The method of claim 1, wherein the thiosulfate is one or more selected from the group consisting of ammonium thiosulfate, calcium thiosulfate, magnesium thiosulfate and potassium thiosulfate.

5. The method of claim 4, wherein the thiosulfate is applied incrementally via fertigation.

6. The method of claim 1, wherein the thiosulfate is applied from bloom until harvest of fruit from the tree.

7. The method of claim 1, further comprising applying an agriculturally beneficial substance prior to, substantially simultaneously with, or after application of the thiosulfate.

8. The method of claim 4, wherein the thiosulfate is applied at rates at or below rates required to satisfy the tree's requirement for thiosulfate-associated nutrients other than sulfur.

9. The method of claim 8, wherein the thiosulfate is applied at rates at or below rates required to satisfy the tree's requirement for one or more thiosulfate-associated nutrients selected from the group consisting of nitrogen, potassium, calcium, and magnesium.

10. The method of claim 9, wherein the thiosulfate is applied from bloom until harvest of fruit from the tree.

11. The method of claim 4, comprising applying thiosulfate to achieve a root zone soil pH in the range of about 4.5 to about 7.5 throughout the tree's substantially entire root zone.

12. The method of claim 1, comprising applying thiosulfate to achieve a root zone soil pH in the range of about 5.0 to about 7.0 throughout the tree's substantially entire root zone.

13. The method of claim 4, comprising applying thiosulfate to achieve a root zone soil pH in the range of about 5.0 to about 7.0 throughout the tree's substantially entire root zone.

14. The method of claim 1, comprising applying thiosulfate to achieve a root zone soil pH in the range of about 5.5 to about 6.5 throughout the tree's substantially entire root zone.

15. The method of claim 4, comprising applying thiosulfate to achieve a root zone soil pH in the range of about 5.5 to about 6.5 throughout the tree's substantially entire root zone.

16. The method of claim 1, comprising applying thiosulfate to achieve a root zone soil pH in the range of about 5.5 to about 6.0 throughout the tree's substantially entire root zone.

17. The method of claim 4, comprising applying thiosulfate to achieve a root zone soil pH in the range of about 5.5 to about 6.0 throughout the tree's substantially entire root zone.

18. The method of claim 1, comprising applying thiosulfate to soil on or near the tree's roots.

19. The method of claim 4, comprising applying thiosulfate to soil on or near the tree's roots.

20. The method of claim 1, comprising applying thiosulfate to soil on or near the tree's roots on at least a monthly basis during the tree's growing season.

21. The method of claim 4, comprising applying thiosulfate to soil on or near the tree's roots on at least a monthly basis during the tree's growing season.

22. The method of claim 1, comprising applying thiosulfate to achieve a root zone soil pH in the range of about 5.0 to about 7.5 throughout the tree's substantially entire root zone.

\* \* \* \* \*